Patented Mar. 9, 1926.

1,575,679

UNITED STATES PATENT OFFICE.

JAROSLAV FRÖHLICH, OF BASEL, SWITZERLAND, ASSIGNOR TO SOCIETY OF CHEMICAL INDUSTRY IN BASLE, OF BASEL, SWITZERLAND.

DYESTUFFS AND PROCESS OF MAKING SAME.

No Drawing.  Application filed November 7, 1924.  Serial No. 748,492.

*To all whom it may concern:*

Be it known that I, JAROSLAV FRÖHLICH, a citizen of the Swiss Confederation, and residing at Basel, Switzerland, have invented useful new Dyestuffs and Processes of Making Same, of which the following is a full, clear, and exact specification.

The present invention relates to new vat dyestuffs which are particularly valuable for producing fast tints on the animal fibre. The invention comprises the new dyestuffs, the method of making same, and the material dyed with the new vat dyestuffs.

It has been found that valuable vat deystuffs are obtained by causing sulfur monochloride $S_2Cl_2$ to act upon 2:5-diarylidobenzoquinones at temperatures that do not exceed 100° C. This reaction may be conducted in presence of a diluent and with addition of an agent which binds acids, as for example sodium acetate or magnesium oxide, and a condensing agent, as for example sulphuric acid. The proportions which the reacting substances bear to each other may be varied within wide limits.

Particularly suitable for the reaction are 2:5-diarylidobenzoquinones, which are not substituted or are only mono-substituted (in 3- or 6-position) in the quinone nucleus. The 2:5-diarylidobenzoquinones, the manufacture of which is generally known, may be derived from two aromatic amines which may be the same or different and may be mono-substituted at the nitrogen or mono- or poly-substituted in any position of the nucleus. As substituents there may be named, among others, halogen, alkyl-, alkoxyl- ($OCH_3$), phenyloxy- ($OC_6H_5$), nitro-, amino-, alkylamino-, aralkylamino-, phenylamino-, hydroxyl- or carboxyl-groups.

The dyestuffs thus obtained form dark, yellow to dark blue and black powders and contain sulphur and mostly also halogen. They dissolve in concentrated sulphuric acid to a •brown to red-violet and blue green solution. With hydrosulphite and caustic soda lye they give bright yellow to brown vats from which wool is dyed fast yellow-brown to red-brown, olive-green, green and grey tints.

The following examples illustrate the invention without, however, limiting the scope of the same, the parts being by weight:—

*Example 1.*

7.2 parts of 2:5-dianilidobenzoquinone corresponding with the formula:

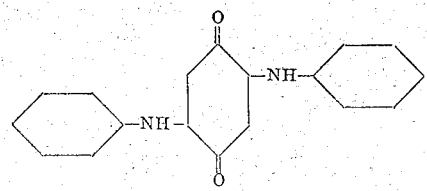

are suspended in 144 parts of nitrobenzene and 11 parts of sulphur monochloride ($S_2Cl_2$) are added at 2-6° C. while stirring well. After continued stirring the mixture is filtered, and the solid product washed and dried. It is a brown powder which dissolves in concentrated sulphuric acid to a dirty blue solution and dyes wool in a hydrosulphite vat fast brownish tints.

In a similar manner brown-dyeing dyestuffs containing sulphur and halogen and dissolving in sulphuric acid with violet to blue color are obtained from 2:5-di (β-naphthylamido)-benzoquinone and from 2:5-diparatoluididobenzoquinone.

Dyestuffs giving yellow or, respectively, greenish-grey tints are obtained from 2:5-diparaoxyanilidobenzoquinone or, respectively, from 2:5-dimetaanilidobenzoquinone.

If the reaction of 2:5-dianilidobenzoquinone on sulphur chloride is conducted in the presence of an agent adapted to bind acid, such as magnesia, there is obtained a dyestuff of like properties which dyes wool in the vat dark brown tints, while addition of sodium acetate shifts the tint towards olive.

*Example 2.*

14.5 parts of 2:5-dianilidobenzoquinone are dissolved in 435 parts of cold concentrated sulphuric acid, and the solution is mixed slowly at 5° C. with 34 parts of sulphur monochloride. The mixture is stirred for a long time during which the temperature is very cautiously raised to 70° C; and is poured into water and filtered, the solid matter being washed and dried. The dyestuff formed is a greenish-black powder, soluble in concentrated sulphuric acid to a dirty violet solution. With hydrosulphite and caustic soda lye it gives a bright yellowish vat which dyes wool fast green tints.

If the reaction be interrupted at an earlier stage, there is produced a dyestuff with a yellow-green tint.

*Example 3.*

40 parts of 2:5-dianilido-6-chloro-1:4-benzoquinone are suspended in 800 parts of nitrobenzene and the suspension is mixed at 5° C. with 50.5 parts of sulphur monochloride and the whole is thoroughly stirred for a long time at this temperature. It is then diluted with alcohol, filtered and the solid matter washed and dried. The new dyestuff forms a brownish-yellow powder which dissolves in concentrated sulphuric acid to a violet solution and dyes wool fast yellow-brown tints in the vat.

The substitution of 2:5-dianilido-6-methyl-1:4-benzoquinone for the 2:5-dianilido-6-chloro-1:4-benzoquinone produces a dyestuff which is a red-violet powder soluble in sulphuric acid to a dull greenish-blue solution and dyeing wool in the vat blackish-brown.

What I claim is:—

1. As a new process, the manufacture of vat dyestuffs, which consists in causing sulphur monochloride to act upon 2:5-diarylidobenzoquinones at temperatures not exceeding 100° C.

2. As a new process, the manufacture of vat dyestuffs, which consists in causing sulphur monochloride to act upon 2:5-diarylidobenzoquinones in presence of a diluent at temperatures not exceeding 100° C.

3. As a new process, the manufacture of vat dyestuffs, which consists in causing sulphur monochloride to act upon 2:5-dianilidobenzoquinone at temperatures not exceeding 100° C.

4. As a new process, the manufacture of vat dyestuffs, which consists in causing sulphur monochloride to act upon 2:5-dianilidobenzoquinone in presence of a diluent at temperatures not exceeding 100° C.

5. As new products, the dyestuffs obtained as described from 2:5-diarylidobenzoquinones and sulphur monochloride, which form dark yellow to dark blue and black powders, dissolving in concentrated sulphuric acid to brown to red-violet and blue-green solutions and giving with hydrosulphite and caustic soda lye bright yellow to brown vats from which wool is dyed fast yellow-brown to red-brown, olive-green, green and grey tints.

6. As new products, the dyestuffs obtained as described from 2:5-diarylidobenzoquinones and sulphur monochloride containing sulphur and also chlorine, which form dark yellow to dark blue and black powders, dissolving in concentrated sulphuric acid to brown to red-violet and blue-green solutions and giving with hydrosulphite and caustic soda lye bright yellow to brown vats from which wool is dyed fast yellow-brown to red-brown, olive-green, green and grey tints.

7. As new products, the dyestuffs obtained as described from 2:5-dianilidobenzoquinones and sulphur monochloride containing sulphur and also chlorine, which form dark yellow to dark blue and black powders, dissolving in concentrated sulphuric acid to violet to blue solutions and giving with hydrosulphite and caustic soda lye bright yellow to brown vats from which wool is dyed fast brown to green tints.

8. Material dyed with the dyestuffs of claim 5.

9. Material dyed with the dyestuffs of claim 6.

10. Material dyed with the dyestuffs of claim 7.

In witness whereof I have hereunto signed my name this 24th day of October, 1924.

JAROSLAV FRÖHLICH.